United States Patent
Tear (10) Patent No.: US 11,448,484 B2
(45) Date of Patent: Sep. 20, 2022

(54) IMPACT ABSORPTION STRUCTURE COMPRISING AN IMPACT RECEIVING COMPONENT AND AN ENERGY DISSIPATION COMPONENT

(71) Applicant: SYNBIOSYS LTD, London (GB)

(72) Inventor: Gareth Tear, London (GB)

(73) Assignee: SYNBIOSYS LTD, Greater London (GB)

( * ) Notice: Subject to any disclaimer, the term of this patent is extended or adjusted under 35 U.S.C. 154(b) by 206 days.

(21) Appl. No.: 16/980,261

(22) PCT Filed: Mar. 12, 2019

(86) PCT No.: PCT/GB2019/050673
§ 371 (c)(1),
(2) Date: Sep. 11, 2020

(87) PCT Pub. No.: WO2019/175557
PCT Pub. Date: Sep. 19, 2019

(65) Prior Publication Data
US 2021/0025677 A1   Jan. 28, 2021

(30) Foreign Application Priority Data

Mar. 12, 2018 (GB) .................................. 1803899

(51) Int. Cl.
*F41H 5/04* (2006.01)
*B32B 9/00* (2006.01)
(Continued)

(52) U.S. Cl.
CPC ........... *F41H 5/0421* (2013.01); *B32B 9/005* (2013.01); *B32B 15/20* (2013.01); *B32B 27/20* (2013.01);
(Continued)

(58) Field of Classification Search
None
See application file for complete search history.

(56) References Cited

U.S. PATENT DOCUMENTS 4,048,365 A   9/1977  Hoover
4,768,418 A   9/1988  Blommer et al.
(Continued)

FOREIGN PATENT DOCUMENTS

| AU | 2018200285 A1 * | 2/2018 | ............ B32B 5/245 |
|---|---|---|---|
| CN | 101650148 A | 2/2010 | |
| CN | 113405405 A * | 9/2021 | |
| EP | 1377788 B1 | 2/2011 | |

OTHER PUBLICATIONS

PCT/GB2019/050673 International Search Report and Written Opinion dated May 29, 2019, 16 pp.
GB1803899.2 Search Report dated Sep. 6, 2018, 3 pp.

*Primary Examiner* — Reginald S Tillman, Jr.
(74) *Attorney, Agent, or Firm* — Lathrop GPM LLP (57) ABSTRACT

An impact absorption structure (1) is provided. The impact absorption structure (1) comprises an impact receiving component (3), capable of, after receiving an initial impact shockwave, separating that shockwave into at least a first shockwave (S11) and a second shockwave (S122), time-spaced from the first shockwave (S11). The impact absorption structure (1) also comprises an energy dissipation component (5) adjacent to the impact receiving component (3), such that the time-spaced shockwaves (S11, S122) can be passed across an interface from the impact receiving component (3) to the energy dissipation component (5). The energy dissipation component (5) comprises a chemical element or compound such as calcite exhibiting a first displacive phase change from a first phase to a second phase (52) upon experiencing the first shockwave (S11), a second displacive phase from the second phase (52) to a third phase (53) upon experiencing the second, later shockwave (S122), (Continued)

and a third displacive phase change from the third, or a later, phase (53) to the first phase upon unloading after the second shockwave (S122), the compound thereby exhibiting a hysteresis cycle in which elastic energy is dissipated.

10 Claims, 7 Drawing Sheets

(51) Int. Cl.
     *B32B 15/20*     (2006.01)
     *B32B 27/20*     (2006.01)
     *B32B 27/36*     (2006.01)

(52) U.S. Cl.
     CPC ......... *B32B 27/365* (2013.01); *F41H 5/0428* (2013.01); *F41H 5/0457* (2013.01); *B32B 2264/107* (2013.01); *B32B 2307/56* (2013.01)

(56) References Cited

U.S. PATENT DOCUMENTS

| | | | |
|---|---|---|---|
| 7,685,922 | B1 | 3/2010 | Martin et al. |
| 8,141,317 | B1* | 3/2012 | Qiao .................... F41H 5/0414 52/633 |
| 9,909,843 | B1 | 3/2018 | Gamache et al. |
| 2005/0070185 | A1 | 3/2005 | Schneider |
| 2009/0136702 | A1 | 5/2009 | Gu |
| 2014/0099472 | A1* | 4/2014 | Greenhill ............... A63B 71/10 427/532 |
| 2014/0137726 | A1* | 5/2014 | Wagner ................ F41H 5/0471 156/60 |
| 2015/0226527 | A1 | 8/2015 | Bottiglieri et al. |
| 2016/0200882 | A1* | 7/2016 | Bhat ........................ B32B 5/26 442/327 |

\* cited by examiner

IMPACT ABSORPTION STRUCTURE COMPRISING AN IMPACT RECEIVING COMPONENT AND AN ENERGY DISSIPATION COMPONENT

FIELD OF THE INVENTION

The present invention concerns Impact absorption structures.

Prior art impact absorption structures comprise composite materials that are engineered to dissipate energy during impact. For example, the aramid fibre composite sold under the trademark Kevlar® is widely used in armour for ballistic impact due to its ability to dissipate a relatively large amount of the energy associated with such an impact. However, a problem with prior art impact absorption structures is that the energy imparted into the structure during an impact is dissipated via large plastic deformation of the structure and internal work of friction (interstitial friction) between fibres. Such deformation is irreversible which means that the structures have a limited life-span and have to be replaced after a limited number of impact events.

Certain materials exhibit a hysteresis cycle upon elastic loading and unloading such that energy is dissipated within the material and the material is able to return to its original undeformed stated. Calcite is an example of such a material.

The ability of Calcite to dissipate energy during elastic loading and unloading is due to the material undergoing a plurality of displacive phase changes during the loading cycle. A displacive phase change is one in which the atoms of the material rearrange themselves through translation or distortion of the crystal lattice, and is therefore very fast and reversible.

Figure 1:
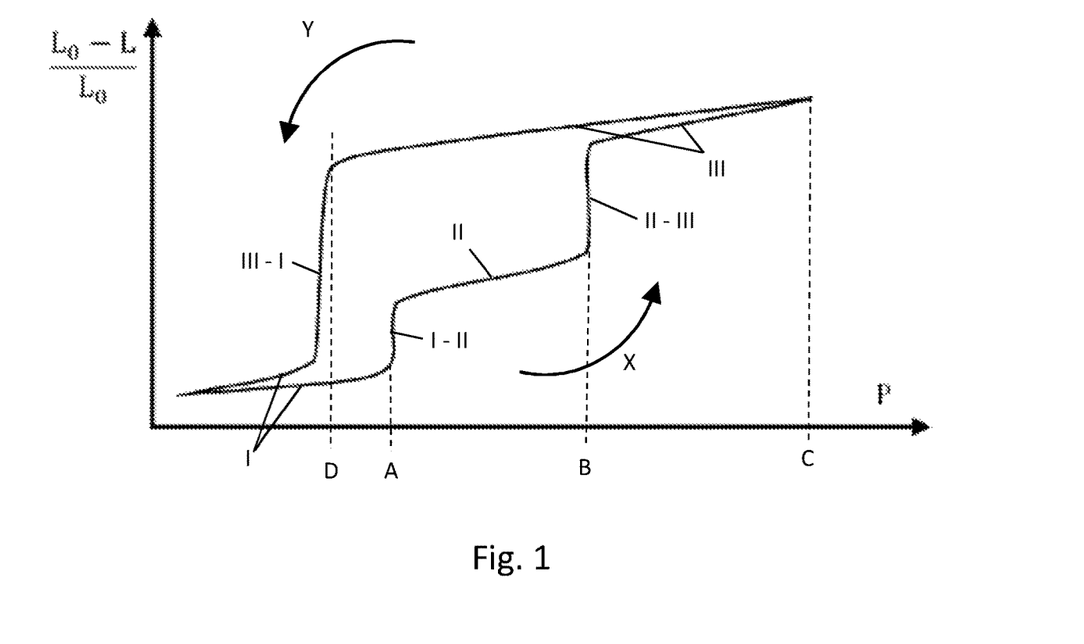
FIG. 1 shows schematically the hysteresis cycle exhibited during quasi-static hydrostatic loading and unloading of Calcite.

The hysteresis cycle exhibited by Calcite crystal under quasi-static hydrostatic loading and unloading is schematically shown in FIG. 1 in which the x-axis represents the load "P" and the y-axis represents the strain within the material "$L-L_0/L$". As can be seen, upon initiation of the loading in the direction of the arrow labelled "X" the Calcite is in its first phase, phase I (labelled "I" in FIG. 1), then at a load "A" a first phase change is initiated, labelled "I-II", in which the phase I Calcite transforms into phase II Calcite. Upon further loading of the phase II Calcite, labelled "II", the load "B" is reached at which a second phase change is initiated, labelled "II-III". During the second phase change the phase II Calcite becomes phase III Calcite. During the third phase (labelled "III" in FIG. 1), the phase III Calcite is loaded up to a load "C" whereupon it is unloaded in the direction of the arrow labelled "Y". Upon reaching a load "D" during unloading a third phase change labelled "III-I" is initiated wherein the phase III Calcite transforms into phase I Calcite. The phase I Calcite is then unloaded completely to return to its original undeformed shape. As can be seen from the plot in FIG. 1, the result of the phase changes occurring during loading and unloading is a hysteresis cycle in which elastic energy has been dissipated.

Figure 2:
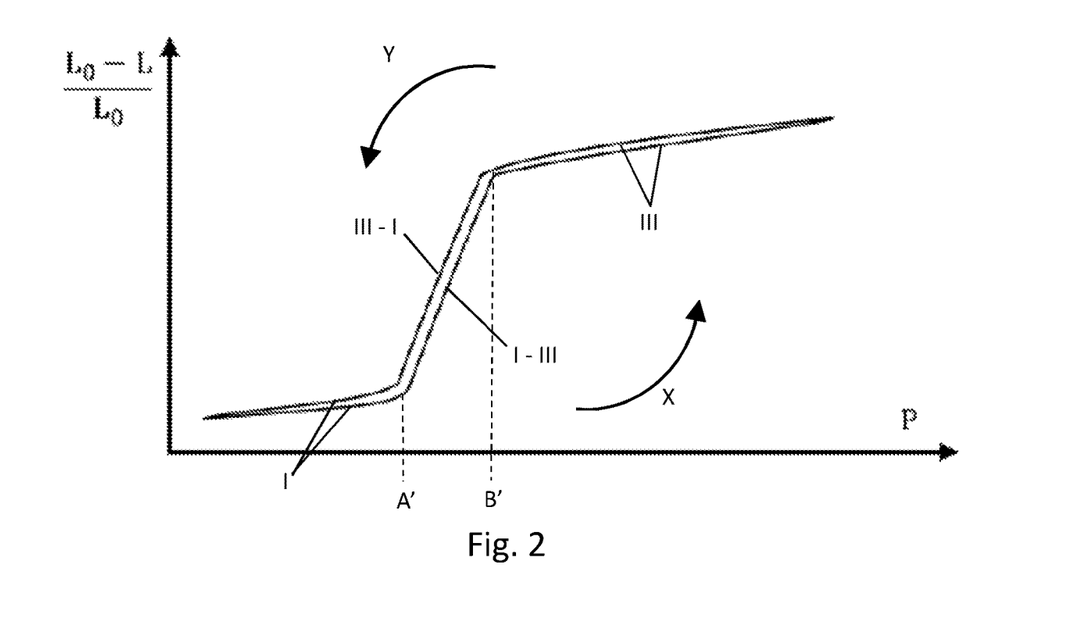
FIG. 2 shows schematically the hysteresis cycle during loading and unloading of Calcite under single shock compression.

Calcite has been studied in shock compression by Grady, D. E. (1986). High-Pressure Release-Wave Measurements and Phase Transformation in CaCO3. In Y. M. Gupta (Ed.), Shock Waves in Condensed Matter (pp. 589-593). Spokane, Wash.: Springer US and it has been observed that, during impact, a shock wave can be produced within the Calcite which compresses the Calcite enough to drive it into a phase change. However, in normal impact conditions (i.e. when the shock sequence is not properly engineered), the first shock which travels through the material automatically causes the Calcite to transition from phase I to phase III, bypassing the phase change from phase I to phase II. This is because the I-III shockwave speed is faster than the I-II shockwave speed. The result of bypassing phase II is shown in the hysteresis cycle shown schematically in FIG. 2. As can be seen, a phase change from phase I to phase III, labelled "I-III'", occurs between loads "A'" and "B'" upon loading, and a phase change from phase III to phase I, labelled "III-I'", occurs between similar loads upon unloading. This results in much less energy being dissipated than in the hysteresis cycle of FIG. 1.

The present invention seeks to mitigate the above-mentioned problems.

SUMMARY OF THE INVENTION

The present invention provides, according to a first aspect, an impact absorption structure comprising an impact receiving component, capable of, after receiving an initial impact shockwave, separating that shockwave into at least a first shockwave and a second shockwave, time-spaced from the first shockwave, an energy dissipation component adjacent to the impact receiving component, such that the time-spaced shockwaves can be passed across an interface from the impact receiving component to the energy dissipation component, wherein the energy dissipation component comprises a chemical element or compound that exhibits a first displacive phase change from a first phase to a second phase upon experiencing the first shockwave, a second displacive phase from the second phase to a third phase upon experiencing the second, later shockwave, and a third displacive phase change from the third, or a later (e.g. fourth, fifth or sixth etc.), phase to the first phase upon unloading after the second shockwave, the compound thereby exhibiting a hysteresis cycle in which elastic energy is dissipated.

In other words, the energy dissipation component comprises a chemical element or compound that exhibits a first displacive phase change from a first phase to a second phase, a second displacive phase change from a second phase to a third phase, any number (including zero) of possible further phase changes from the third phase to a fourth phase, fourth to fifth etc. up to an nth phase, and then a final displacive phase change from the nth phase to the first phase upon unloading after the second shockwave. "nth phase" may be the third, fourth, fifth, sixth etc. phase.

The present invention recognises that an impact absorption structure can be engineered such that, following an impact by a projectile, a shock propagation sequence occurs within the structure which sequentially initiates specific displacive phase changes within a chemical element or compound. By engineering the shock propagation sequence as such, it is possible to exploit the hysteresis cycle of a chemical compound or element to dissipate the energy imparted to an impact absorption structure following an impact by a projectile. Such an impact absorption structure is therefore able to dissipate energy and return to its original undeformed, un-shocked shape following a full hysteresis cycle, therefore allowing multiple hysteresis cycles before potential material failure.

The impact absorption structure is particularly suited to ballistic impacts. A ballistic impact in this case being defined as one in which a projectile impacts the impact absorption structure at least 100 metres per second and up to 300 kilometres per second.

The chemical element or compound may comprise a lattice structure. The chemical element or compound may be any chemical element or compound that exhibits displacive phase transformations and, upon elastic loading and unloading, a hysteresis curve in which energy is dissipated. The chemical element or compound may be Calcite, Titanium dioxide, Silica, Magnesium Silicate, Sodium, or Iron. The impact receiving component may be Magnesium, Periclase, Fused Silica, Polycarbonate, PMMA (Poly(methyl methacrylate)) or Aluminium. The impact receiving component may be Ethanol, air or water.

The shock impedance of the impact receiving component, may be lower than the shock impedance of the chemical element or compound. The capacity of the impact receiving component to separate the single incoming shock wave generated by the impact of the projectile into two or more shock waves with the right velocity and time-distance to induce the hysteresis in the energy dissipation component depends upon the shock impedance of the impact receiving component. The shock impedance, Z, of a material is a function of the density of the material, $\rho_0$, and the speed of sound of the material, $U_s$:

$$Z=\rho_0 U_s$$

The term "material" is used here to refer to the impact receiving component and/or the chemical element or compound. The shock impedance of the impact receiving component may be chosen to be lower than the shock impedance of a projectile which may impact the impact receiving component. The projectile may comprise or consist of Copper, Aluminium, Steel, Lead, Tungsten Carbide or Tantalum.

The impact absorption structure may be in the form of a laminate formed by a layer (or more than one layer) of impact receiving component and a layer (or more than one layer) of energy dissipation component. The impact absorption structure may comprise a matrix of impact receiving component containing a distribution of particles of the chemical element or compound. The particles may be of a random shape and be randomly distributed/dispersed within the matrix of impact receiving component. The impact absorption structure may have a brick and mortar architecture in which particles of the chemical element or compound of a well-defined geometrical shape are distributed/dispersed within a matrix of impact receiving component in a well-defined geometrical order.

The impact receiving component and the energy dissipation component may be configured such that, after the impact receiving component receives an initial impact shockwave, that shock wave is separated into the first shockwave and the second shockwave, time-spaced from the first shockwave, as a result of the initial impact shockwave being reflected at the interface between the impact receiving component and energy dissipation component. The impact absorption structure may be configured such that the second shockwave is a reflection of the initial impact shockwave, the second shockwave being reflected back into the impact receiving component and travelling through the impact receiving component to an interface between the impact receiving component and a projectile which has impacted the impact receiving component. The second shockwave may be reflected at an interface between the impact receiving component and a projectile which has impacted the impact receiving component, after such a reflection the second shockwave may travel in the same direction as the first shockwave but behind the first shockwave such that the second shockwave enters the energy dissipation component at a later time than the first shockwave, the second shockwave thereby being time-spaced from the first shockwave.

Preferably the chemical element or compound is Calcite. By proper engineering of the shock propagation sequence, Calcite can be driven from phase I Calcite to phase II Calcite by a first shockwave, and then from phase II Calcite into phase III Calcite by a second shockwave, and then allowed to release to ambient pressure. During this process the Calcite dissipates an estimated 4 Mega-Joules per cubic metre. This is an order of magnitude lower than the energy dissipated by, for example, Kevlar®. However the toughness of Kevlar® fibres is a result of their large plastic strain to failure (up to 10%). In contrast, the strain experienced by the Calcite is less than 2%. Coupled with Calcite's relatively high speed of sound (7 kilometres per second as compared to 2 kilometres per second for the polymer fibres), Calcite can achieve a much faster dissipation of energy in a much larger volume than can be achieved with present fibre-based impact absorption structures. The energy absorption density and speed of sound of Calcite means that Calcite can dissipate energy at a rate of 100 kilo-Joules per square metre per microsecond. Because the hysteresis mechanism is a fundamental thermodynamic process propagating at the shock velocity, it is effective against projectiles that travel of speeds of up to 7 kilometres per second.

According to a second aspect of the invention there is also provided armour or armoured casing comprising an impact absorption structure according to the first aspect of the invention.

The armour may be for a building or a vehicle, such as a tank, truck, airplane, helicopter, airship, ship or submarine. The armour may be for protecting a window of the building or vehicle, such that the window is blast-proof, fragment-proof and/or bulletproof. In particular, the building may be an airport, train or bus station, stadium, auditorium, diplomatic and/or government building, an energy generation site or part of an industrial complex. The armour may be personal protection for use in both military and civilian applications. The armoured casing may be a casing for energetic/explosive materials (e.g. explosives or rocket propellant) and sensitive munitions.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 3A:
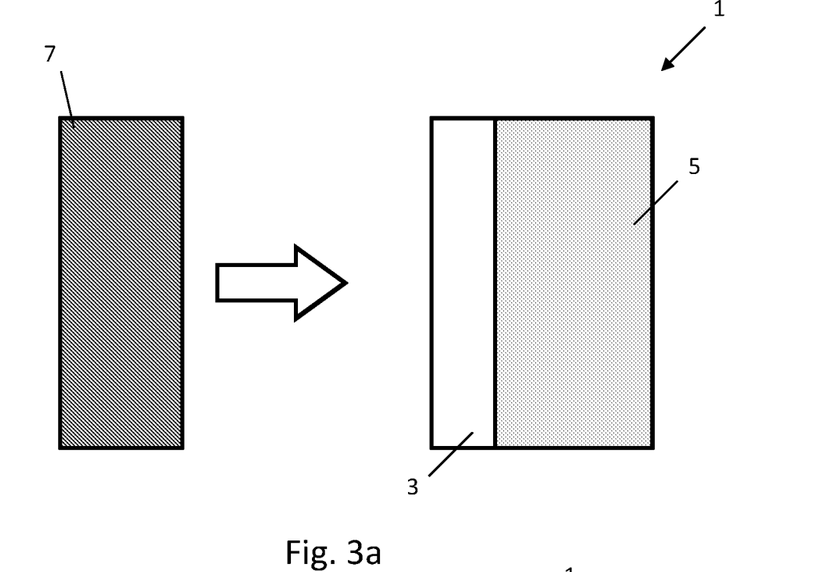
FIG. 3a is a schematic diagram of a projectile approaching an impact absorption structure according to a first embodiment of the invention.

An impact absorption structure 1 according to a first embodiment of the invention is shown schematically in FIG. 3a. The impact absorption structure 1 is shown in the form of a laminate comprising a Polycarbonate layer 3 adjacent to a Calcite layer 5. The Polycarbonate layer 3 therein acting as an impact receiving component and the Calcite layer 5 acting as an energy dissipation component. The laminate has been designed, as will be discussed in more detail below, so that upon impact of the impact receiving component by a Copper projectile 7 travelling in the direction of the arrow shown in FIG. 3a, a shock propagation sequence occurs which ensures that both the phase I to phase II phase transformation and phase II to phase III phase transformation are sequentially initiated before the Calcite unloads, thereby ensuring that the hysteresis cycle corresponding to FIG. 1 occurs.

Figure 3B:
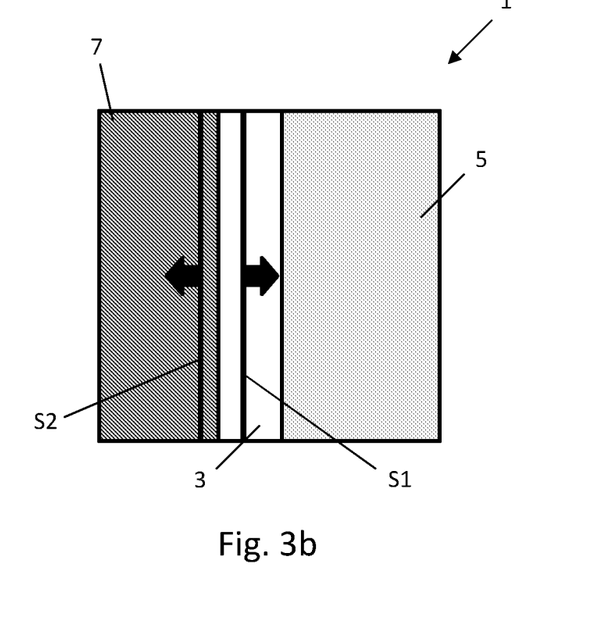
FIG. 3b is a schematic diagram of the impact absorption structure just after the impact receiving component has been impacted by the projectile.
Figure 3C:
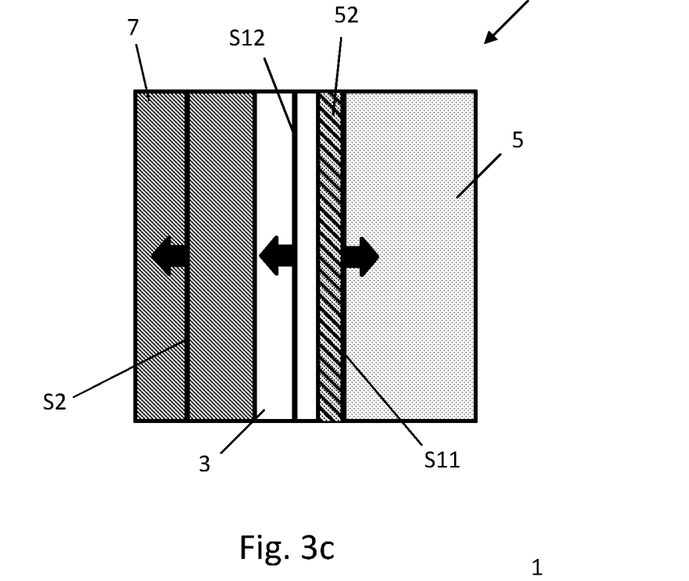
FIG. 3c corresponding to FIG. 3b but at a later time wherein a first shockwave S11 has entered the energy dissipation component.

The shock propagation sequence that occurs upon impact of the impact absorption structure 1 with a projectile 7 will now be described with reference to FIGS. 3b to 3e. FIG. 3b shows the projectile 7 upon impact with the surface of the Polycarbonate layer 3 wherein a shock wave S1 propagates into the Polycarbonate layer 3 and a shockwave S2 propagates into the projectile 7 in the opposite direction to the direction of travel of the shockwave S1. The shockwave S1 then reaches the interface between the Polycarbonate 3 and Calcite 5 layers and is split into shockwaves S11 and S12, as shown in FIG. 3c. Shockwave S11 propagates into the phase I Calcite layer 5 and initiates the phase I to phase II phase transformation as it passes through the Calcite I layer 5, thereby leaving behind phase II Calcite 52 in its wake. Shockwave S12 is reflected at the Polycarbonate/Calcite interface and travels back into the Polycarbonate layer 3, in the opposite direction to shockwave S11.

Figure 3D:
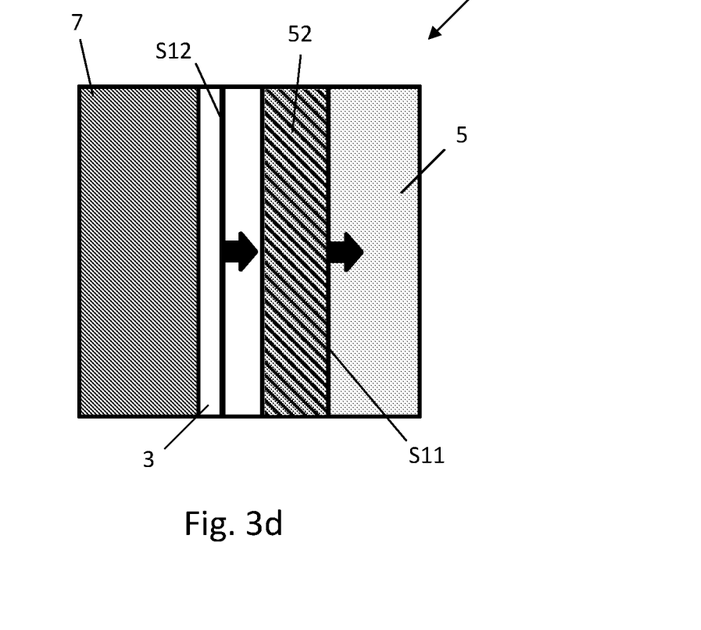
FIG. 3d corresponds to FIG. 3c but at a later time wherein the shockwave S11 has passed further into the energy dissipation component and is approached by shockwave S12.
Figure 3E:
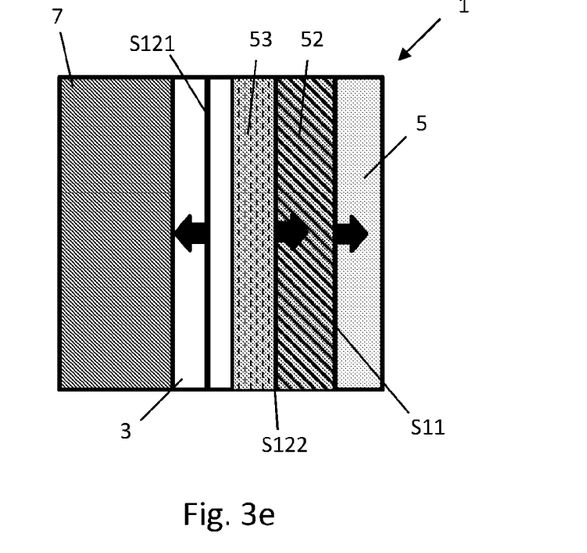
FIG. 3e corresponds to FIG. 3d but at a later time wherein the shockwave S122 has passed into the energy dissipation component and follows the shockwave S11 thus allowing the completion of the hysteresis cycle.

FIG. 3d shows a later time in the shock propagation sequence wherein the shockwave S12 has been reflected at the interface between the projectile 7 and the Polycarbonate and is now travelling in the same direction as the shockwave S11. Upon reaching the Polycarbonate/Calcite interface, the shockwave S12 splits into two components, S121 and S122, as shown in FIG. 3e. Shockwave S121 is reflected back into the Polycarbonate layer 3. However, shockwave s122 propagates into the Calcite layer 5, which is now phase II Calcite 52, and follows the shock-wave S11. The shockwave S122 which is time spaced from the shock-wave S11 initiates the phase II to phase III phase transformation as it passes through the Calcite II layer, thereby leaving behind phase III Calcite 53 in its wake. It is noted that the S122 shockwave travels faster than the S11 shockwave, so if the Calcite layer 5 is thick enough the S122 shockwave will eventually catch up with and intercept the S11 shockwave. During the subsequent wave reflections and attenuations, the phase III Calcite 53 will unload, thereby initiating the phase III to phase I phase transformation and, as such, the Calcite within the impact absorption structure 1 will have undergone the hysteresis cycle corresponding to FIG. 1.

For this particular type of shock propagation sequence to occur, the shock impedance of the impact receiving component, in this case Polycarbonate, must be lower than that of the energy dissipation component in this case Calcite, and of the projectile 7, which in this case is made of Copper. To maximize the energy absorbed by the hysteresis cycle the shock wave S11 must transform the phase I Calcite into phase II Calcite which is at the highest pressure possible in the Calcite II stability region.

Figure 4:
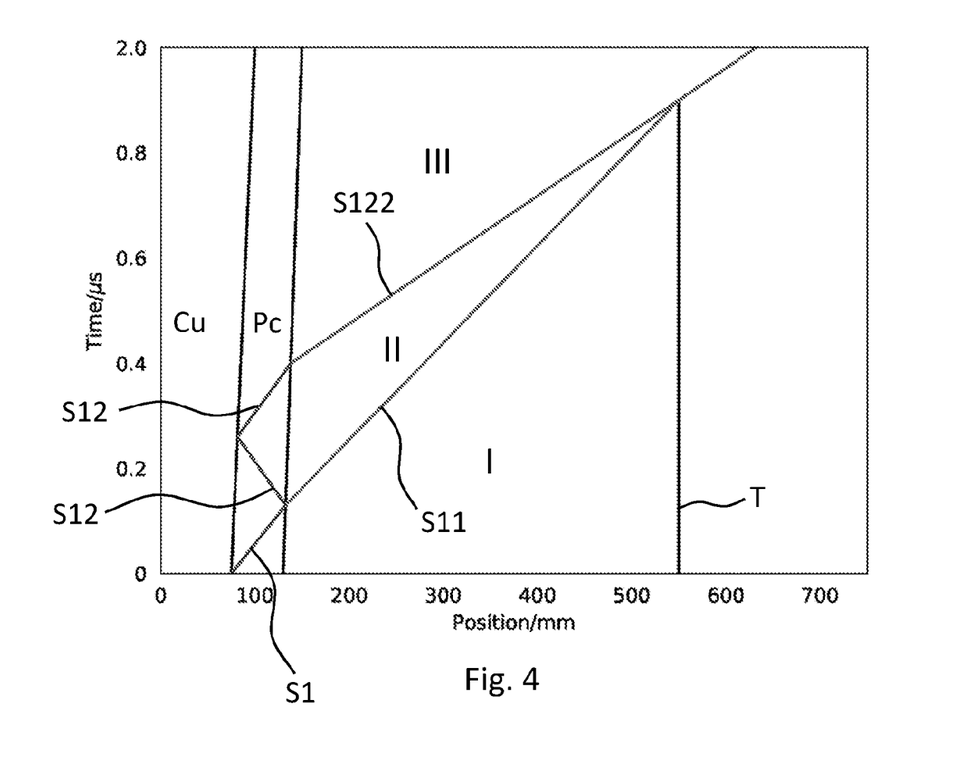
FIG. 4 shows a schematic position-time plot of the shockwave propagation through the impact absorption structure following an impact by a Copper projectile.

Furthermore, the thickness of the Calcite layer 5 can be optimised. FIG. 4 shows a schematic position-time plot of the shockwave propagation through the Polycarbonate and Calcite following an impact by a Copper projectile 7, with time in microseconds represented on the y-axis and position in millimetres represented on the x-axis. Along the x-axis the region labelled "Cu" represents the Copper projectile 7, the region labelled "Pc" represents the Polycarbonate impact receiving layer 3, the region labelled "I" represents phase I Calcite, the region labelled "II" represents phase II Calcite, and the region labelled "III" represents phase III Calcite. In FIG. 4, the copper impactor hits the energy absorption structure 1 thereby shocking the Polycarbonate layer 3 forming the S1 wave which propagates into the Calcite layer 5 as the S11 wave and initiates the Calcite phase I to phase II transition. The reflected S12 shock in the Polycarbonate is delivered back into the Calcite around 0.4 microseconds later as the S122 shock which initiates the Calcite phase II to phase III transformation. As already described, the S122 wave is faster than the S11 wave and so catches up with the S11 wave ahead of it at time t=0.9 microseconds. The optimum Calcite thickness in this case is 550 millimetres, which is where the Calcite S122 wave intercepts the S11 wave at the location labelled T in FIG. 4. Once the S122 shock overtakes the S11 shock, the S11 shock will be passing through phase I Calcite and will therefore be initiating the phase I to phase III transformation which exhibits the hysteresis cycle shown in FIG. 2 and is undesirable from an energy dissipation perspective.

In reality there are additional elastic shocks to consider which mean the optimal thickness has to be experimentally determined (for example, the initial wave at the polycarbonate/Calcite boundary creates two waves in the Calcite: a Calcite I compression wave and a phase I to phase II transformation wave).

Figure 10:
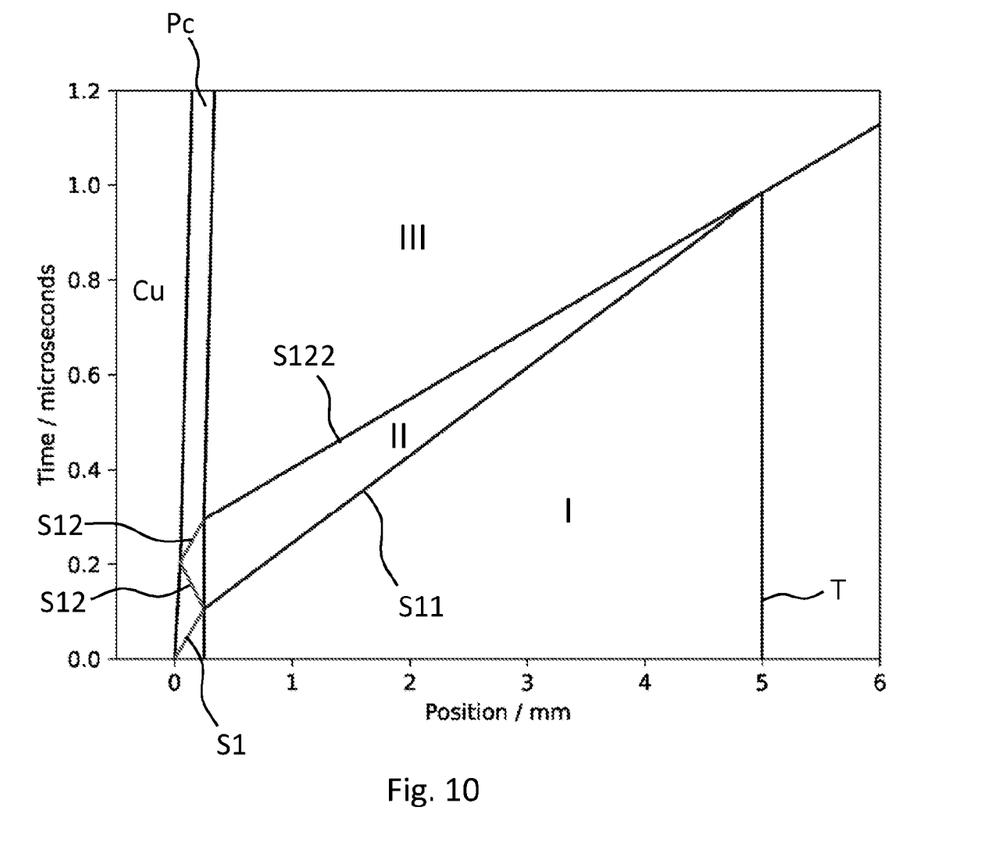
FIG. 10 shows a different schematic position-time plot of a shockwave propagation through the impact absorption structure following an impact by a Copper projectile.

The wave positions and time frames in FIG. 4 are given for illustrative purposes only. In reality, the positions and timeframes observed for Calcite would be different. FIG. 10. shows an updated schematic position-time plot of a shockwave propagation through an impact absorption structure having a polycarbonate layer with a thickness of 260 micrometres following an impact by a Copper projectile. FIG. 10 gives a more accurate representation of the wave positions and time frames that would be observed in Calcite. The reflected S12 shock in the Polycarbonate is delivered back into the Calcite around 0.3 microseconds later as the S122 shock which initiates the Calcite phase II to phase III transformation. As already described, the S122 wave is faster than the S11 wave and so catches up with the S11 wave ahead of it at time t=0.98 microseconds. The optimum Calcite thickness in this case is 5 millimetres, which is where the Calcite S122 wave intercepts the S11 wave at the location labelled T in FIG. 10.

The present invention has been described and illustrated with reference to an embodiment wherein the impact receiving component has a lower shock impedance than the energy dissipation component and projectile. However, it will be appreciated by those of ordinary skill in the art that the invention lends itself to many different variations not specifically illustrated herein. By way of example only, certain possible variations will now be described.

Figure 5:
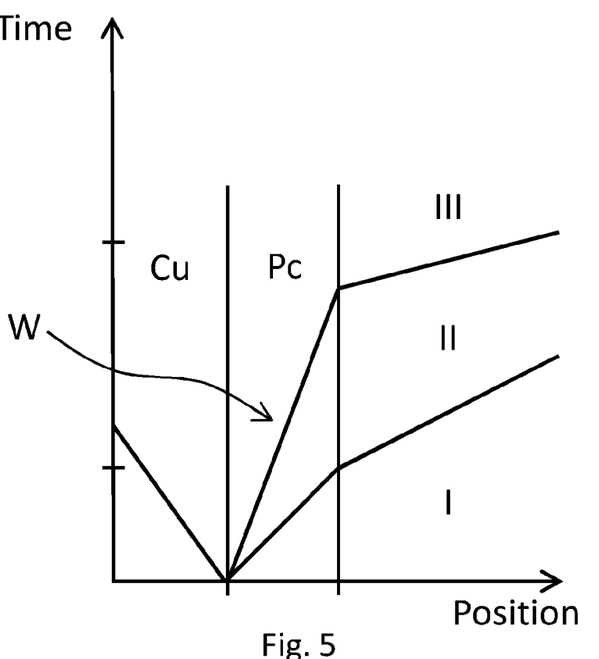
FIG. 5 shows a schematic position-time plot of the shockwave propagation through an impact absorption structure according to a second or third embodiment of the invention following an impact by a Copper projectile.

According to a second embodiment of the invention, the desired hysteresis cycle can achieved by using an impact receiving component with a fast elastic wave speed, a slower plastic wave speed and a yield point which generates an 'elastic precursor' (i.e. a purely elastic shock wave travelling ahead of the main plastic deformation wave) with the right stress to engage the phase transition. A schematic position-time plot corresponding to this arrangement is shown in FIG. 5 with the arrow labelled "W" indicating the elastic/plastic wave separation.

Figure 6:
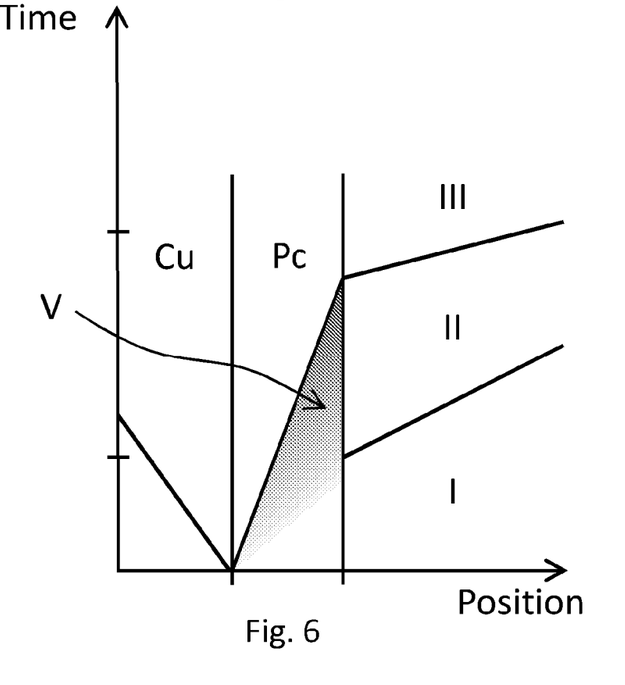
FIG. 6 shows a schematic position-time plot of the shockwave propagation through an impact absorption structure according to a fourth embodiment of the invention following an impact by a Copper projectile.

According to a third embodiment of the invention, a ramp-generating impact receiving component is used. Some materials, for example Fused Silica or materials having a graded density, produce a precursor 'ramp' (i.e. a steady rise in pressure over a microsecond or so) rather than a true shock immediately upon impact. Using such impact receiving components, would have a similar effect to delivering a single optimised shock as it would allow the energy dissipation component the necessary time to phase transform. A schematic position-time plot corresponding to this arrangement is shown in FIG. 6, with the arrow labelled "V" indicating the ramp precursor wave.

Figure 7:
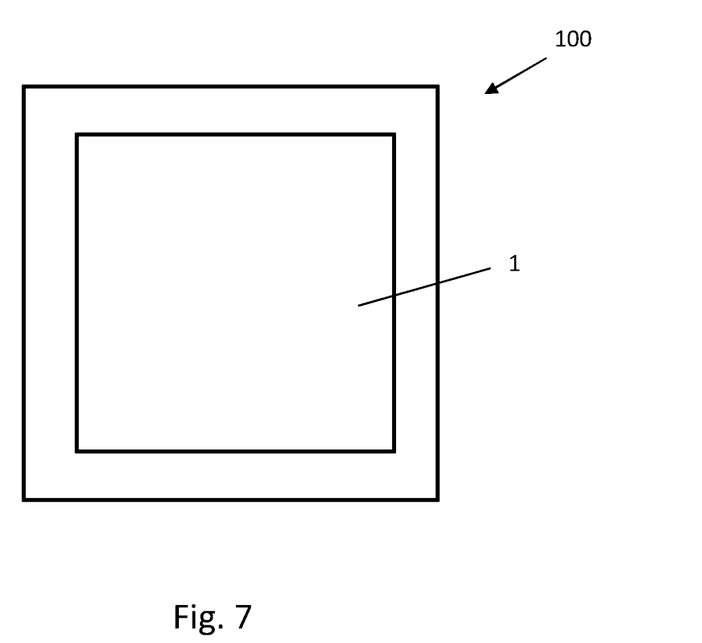
FIG. 7 shows armour according to a fourth embodiment of the invention.

Armour 100 according a fourth embodiment of the invention is shown in FIG. 7. The armour 100 comprises the impact absorption structure 1 according to the first embodiment of the invention. The armour may be used in a building or a vehicle, such as a tank, truck, airplane, helicopter, airship, ship or submarine. The armour may be used for protecting a window of the building or vehicle, such that the window is blast-proof, fragment-proof and/or bulletproof. Alternatively, the armour may be used for personal protection in military and/or civilian applications.

Figure 8:
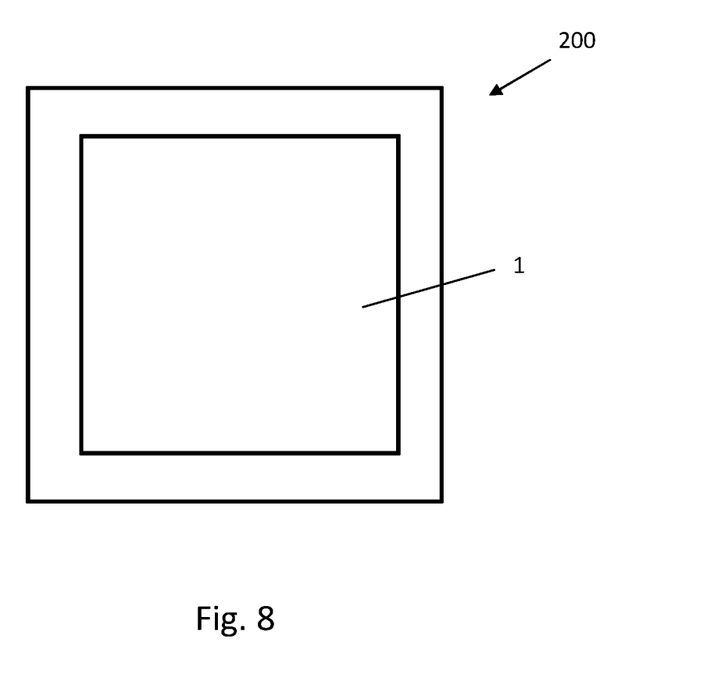
FIG. 8 shows an armoured casing according to a fifth embodiment of the invention.

An armoured casing 200 according to a fifth embodiment of the invention is shown in FIG. 8. The armoured casing 200 comprises the impact absorption structure 1 according to the first embodiment of the invention. The armoured casing can be used as a casing for energetic/explosive materials (e.g. explosives or rocket propellant) and/or sensitive munitions.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

Experimental

Figure 9:
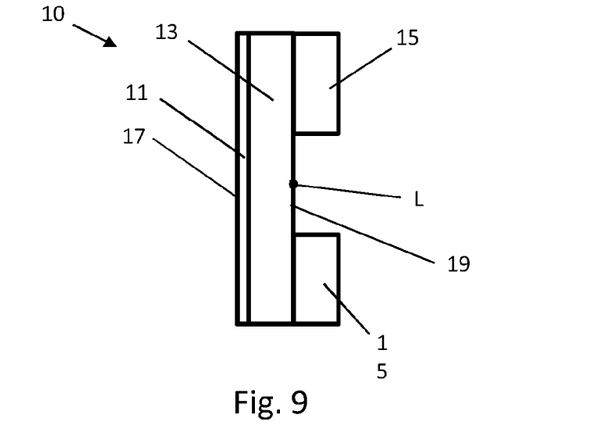
FIG. 9 shows a schematic cross-sectional drawing of a shock absorption structure test piece.

Impact tests were performed on various configurations of shock absorption structure. A light gas gun was used to accelerate projectiles which had been wire cut to ensure flatness and attached to a sabot using a low viscosity epoxy. A schematic cross-sectional view of a shock absorption structure test piece 10 is shown in FIG. 9. The shock absorption structures tested in this case were in laminate form, comprising a layer of impact receiving component 11 and a layer of energy dissipation component 13 bonded to a relatively thick PMMA backing ring 15. The front surface 17 of the impact receiving component 11 was impacted with a projectile and during impact laser interferometry was used to measure the surface velocity of the rear surface 19 of the energy dissipation component 13 at the location labelled L in FIG. 9, measurements of the surface velocity were obtained using Photonic Doppler Velocimetry. The pressure exerted within the Calcite by the first shock was determined by measuring the impact velocity of the projectile and comparing the impactors Hugoniot (measured by Marsh) with the calcite Hugoniot (measured by Ahrens and Grady). The Hugoniots were measured in these references by using symmetric impacts and the Pressure=Density*(Shock velocity)*(particle velocity) Rankine-Hugoniot jump condition. (Grady as previously referenced. Marsh, S. P. (Ed.). (1980). LASL Shock Hugoniot Data (1st ed.). Los Angeles: University of California Press. Ahrens, T. J., & Gregson, V. G. (1964). Shock compression of crystal rocks: Data for quartz, calcite, and plagioclase rocks. J. Geophys. Res., 69(22), 4839-4874). The phase change within the Calcite layer was determined by observing a shock wave instability (discontinuities in rear surface particle velocity), with each instability corresponding to a phase change, and the size of the jump corresponding to the phase. The behaviour of these discontinuities in velocity caused by phase changes is described in detail by Duvall (Duvall, G., & Graham, R. A. (1977). Phase transitions under shock-wave loading. Reviews of Modern Physics, 49(3), 523-579. http://doi.org/10.1103/RevModPhys.49.523).

To ensure that the conditions are as close to one-dimensional as possible, it is critical to ensure that there is no rotation of the projectile during flight such that the flat surface of the projectile impacts the flat surface of the impact receiving component. For this reason, each shock absorption structure test piece was mounted close to the muzzle and aligned with a laser to ensure it is normal to the barrel.

Six tests were performed. The test conditions are shown in Table 1, which lists the projectile material used, Impact Receiving Component (I.R.C) and Energy Dissipating Component (E.D.C) of the laminate, and the impact velocity of the projectile in metres per second (m/s). The test results are shown in Table 2, which lists the properties of the first shock, and where present, the second shock. For the first and second shocks Table 2 indicates the pressure exerted within the Calcite in Giga-Pascals (GPa) and the Calcite phase change caused by the shock. For the first shock and second shock, a phase of I indicates no phase change and II indicates a phase change from phase I to phase II. For the first shock a phase of III indicates a phase change from phase I to phase III and for the second shock a phase of III indicates a phase change from the first shock phase to phase III. Only tests 2 and 6, where the first shock phase is II and the second shock phase is III, absorb energy.

TABLE 1

| Test no. | Projectile | I.R.C. | E.D.C. | Impact velocity (m/s) |
|---|---|---|---|---|
| 1 | Aluminium | Polycarbonate | Calcite | 190 +/− 10 |
| 2 | Copper | Polycarbonate | Calcite | 220 +/− 10 |
| 3 | Copper | Aluminium | Calcite | 130 +/− 10 |
| 4 | Copper | Copper | Calcite | 250 +/− 5 |
| 5 | Aluminium | Polycarbonate | Calcite | 315 +/− 1 |
| 6 | Copper | Polycarbonate | Calcite | 239 +/− 5 |

TABLE 2

| Test no. | First Shock Pressure (GPa) | First Shock Particle Velocity (m/s) | First Phase | Second Shock Pressure (GPa) | Second Shock Particle Velocity (m/s) | Second Phase |
| --- | --- | --- | --- | --- | --- | --- |
| 1 | 0.74 +/− 0.1 | 35 +/− 3 | I | 1.5 +/− 0.2 | 90 +/− 5 | II |
| 2 | 0.97 +/− 0.1 | 50 +/− 5 | II | 4.2 +/− 0.2 | 85 +/− 5 | III |
| 3 | 1.5 +/− 0.2 | 62 +/− 5 | II | No second shock | No second shock | No second shock |
| 4 | 2.7 +/− 0.3 | 115 +/− 5 | III | No second shock | No second shock | No second shock |
| 5 | 1.9 +/− 0.2 | 87 +/− 5 | III | 3.0 +/− 0.2 | 112 +/− 5 | III |
| 6 | 1.4 +/− 0.2 | 63 +/− 5 | II | 5.3 +/− 0.2 | 96 +/− 5 | III |

What is claimed is:

1. An impact absorption structure comprising:
   i) an impact receiving component, capable of, after receiving an initial impact shockwave, separating that shockwave into at least a first shockwave and a second shockwave, time-spaced from the first shockwave,
   ii) an energy dissipation component adjacent to the impact receiving component, such that the time-spaced shockwaves can be passed across an interface from the impact receiving component to the energy dissipation component, wherein the energy dissipation component comprises a chemical element or compound that exhibits:
   a first displacive phase change from a first phase to a second phase upon experiencing the first shockwave,
   a second displacive phase from the second phase to a third phase upon experiencing the second, later shockwave, and
   a third displacive phase change from the third, or a later, phase to the first phase upon unloading after the second shockwave,
   the compound thereby exhibiting a hysteresis cycle in which elastic energy is dissipated.

2. An impact absorption structure according to claim 1, wherein the chemical element or compound comprises a lattice structure.

3. An impact absorption structure according to claim 2, wherein the chemical element or compound is Calcite, Titanium Dioxide, Silica, Magnesium Silicate, Sodium, or Iron.

4. An impact absorption structure according to claim 1, wherein the impact receiving component is Magnesium, Periclase, Fused Silica, Polycarbonate, PMMA, Aluminium, Ethanol, air or water.

5. An impact absorption structure according to claim 1, wherein the shock impedance of the impact receiving component, is lower than the shock impedance of the energy dissipation component.

6. An impact absorption structure according to claim 1 comprising a laminate formed by a layer of impact receiving component and a layer of energy dissipation component.

7. An impact absorption structure according to claim 1, comprising a matrix of impact receiving component containing a distribution of particles of the chemical element or compound.

8. An impact absorption structure according to claim 6, wherein the impact receiving component and the energy dissipation component are configured such that, after the impact receiving component receives an initial impact shockwave, that shock wave is separated into the first shockwave and the second shockwave, time-spaced from the first shockwave, as a result of the initial impact shockwave being reflected at the interface between the impact receiving component and the energy dissipation component.

9. An impact absorption structure according to claim 5, wherein the chemical element or compound is Calcite and the impact receiving component is Polycarbonate.

10. Armour or armoured casing comprising an impact absorption structure according to claim 1.

* * * * *

UNITED STATES PATENT AND TRADEMARK OFFICE
CERTIFICATE OF CORRECTION

PATENT NO. : 11,448,484 B2
APPLICATION NO. : 16/980261
DATED : September 20, 2022
INVENTOR(S) : Gareth Tear It is certified that error appears in the above-identified patent and that said Letters Patent is hereby corrected as shown below:

In the Claims

Column 9, Line 33 Claim 1:
"second displacive phase from the" should read -- second displacive phase change from the --

Column 9, Line 39 Claim 1:
"the compound" should read -- the chemical element or compound --

Signed and Sealed this
Twenty-third Day of January, 2024

Katherine Kelly Vidal
*Director of the United States Patent and Trademark Office*